April 27, 1971 D. G. MILLER ET AL 3,576,653
LEACHABLE CERAMIC CORE
Filed Oct. 20, 1967
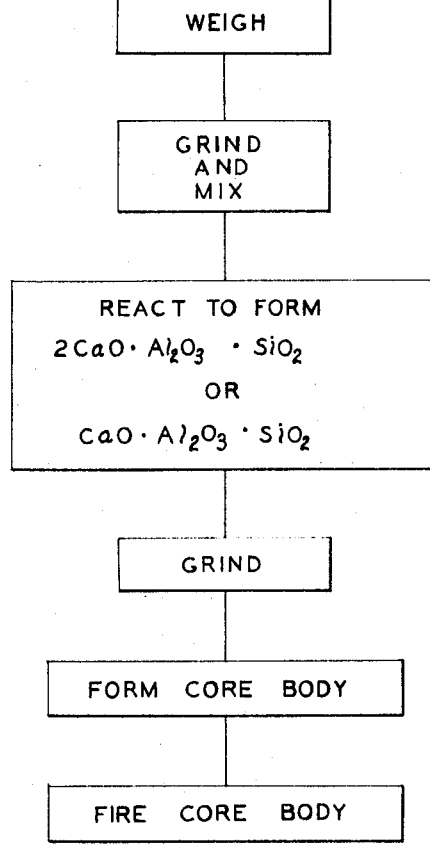
INVENTORS
Donald G. Miller, &
BY Richard H. Singleton
Peter P. Kozak
ATTORNEY

United States Patent Office 3,576,653
Patented Apr. 27, 1971

3,576,653
LEACHABLE CERAMIC CORE
Donald G. Miller, Indianapolis, Ind., and Richard H. Singleton, Pittsburgh, Pa., assignors to General Motors Corporation, Detroit, Mich.
Filed Oct. 20, 1967, Ser. No. 676,922
Int. Cl. B28b 7/34
U.S. Cl. 106—38.9          6 Claims

ABSTRACT OF THE DISCLOSURE

The ternary calcium oxide base compositions, $$CaO.Al_2O_3.SiO_2$$

and $2CaO.Al_2O_3.SiO_2$, form strong sintered core bodies which are readily leachable with water and dilute hydrochloric acids. The ternary calcium oxide based compositions are formed preferably by reacting calcium carbonate, alumina, and fused silica at an elevated temperature. The ternary calcium oxide based composition is ground and shaped into a core body which is subsequently sintered.

---

This invention relates to leachable ceramic cores, and to ceramic based core molding compositions for investment castings, and more particularly to an improved method for preparing such cores.

Most commercial cores used for the production of hollow metal castings contain fused silica. Fused silica is used because it maintains sufficient strength at casting temperatures and may be removed after casting from within the cast article by leaching with molten caustic soda or aqueous hydrofluoric acid. The solubility of fused silica in molten caustic soda or aqueous hydrofluoric acid is relatively low, being of the order of 10 weight percent or less. The low solubility of the fused silica cores in leaching fluids results in incomplete removal of the core from the casting. Incomplete removal of the core due to the inadequate leaching of the core is a major problem which results in casting rejects. Casting rejects are also associated with breakage of the core due to insufficient core strength and/or to the distortion caused by uneven and/or excessive shrinkage of the core.

It is a primary object of this invention to provide a ceramic core which can be leached from the cooling cavity of the hollow castings with water or dilute hydrochloric acid. It is another object of this invention to provide a ceramic core having high strength and low shrinkage characteristics. It is yet another object of this invention to provide a method of forming a high strength, porous ceramic core which can be readily leached with water or dilute acid.

These and other objects of this invention are accomplished by preparing a ceramic core from a ternary calcium oxide base composition containing alumina and fused silica selected from the group consisting of $CaO.Al_2O_3.SiO_2$ and $2CaO.Al_2O_3.SiO_2$. A ceramic core made by firing this composition at an elevated temperature has high strength, low shrinkage and can be readily leached from the cooling cavity of the hollow metal castings with hot dilute hydrochloric acid.

Other objects and advantages of this invention will be apparent from the following detailed description, reference being made to the accompanying drawing wherein a flow diagram depicts the subject process.

Calcium oxide is well known as a ceramic material which is readily soluble in water and which is readily leachable with conventional leaching methods and fluids. Calcium oxide, however, absorbs water readily in air to form calcium hydroxide, a compound which tends to crumble and which does not serve as a suitable core body.

In accordance with this invention, the desirable solubility characteristics of calcium oxide are retained in a ternary calcium oxide base composition. The presence of fused silica and alumina in the ternary composition lowers the sintering temperature of the composition as well as impart hydroscopic stability to the ternary composition. The two ternary compositions included in this invention are $2CaO.Al_2O_3.SiO_2$ and $CaO.Al_2O_3.SiO_2$. These two compositions form ceramic cores which have high strength, high porosity, low shrinkage, and which are soluble in water and hot dilute hydrochloric acid. These compounds are hydroscopically stable enough so that absorption of water is not a critical problem. Tests indicate that these cores can be exposed to the ambient air for several hours without apparent hydration. The porosity of the cores is completely continuous which promotes permeation during leaching.

As shown in the flow diagram, a preferred method of preparing the calcium oxide base ternary compositions is by grinding and mixing molar quantities of calcium carbonate, fused silica and alumina to form a uniform mixture. The mixture is pelletized and heated at an elevated temperature from about 2500° F. up to 2650° F. for about 2 hours to effect a solid state fusion thereby forming the ternary composition. Calcium carbonate is the preferred calcium-containing compound used in the preparation of this composition. Calcium aluminate $$(3CaO.Al_2O_3)$$

or calcium oxide may also be used. Calcium oxide is hydroscopic and as a result is difficult to work with. The silica and the alumina may be supplied by compounds containing silica and alumina, such as mullite and the like.

After the ternary calcium oxide base composition is formed, it is crushed and ground in an argon filled dry box until the particle size is sufficiently small to pass through a −100 mesh U.S. Standard size screen. The ground material is stored in an argon filled dry box to prevent hydration until it is ready to be shaped into a core body. The core body may be formed or shaped by cold pressing a ternary composition powder mixture containing 1 weight percent of a lubricant and binder such as stearic acid and the like, in steel dies under pressure. An alternate method of forming a core body involves incorporating sufficient vinyl plastic binder and a plasticizer such as dioctyl phthalate with the ternary composition powder to permit the resultant flowable mass to be extruded into the desired shape. This method is preferred for forming intricate core shapes. After the green core body is formed it is fired at a temperature between 2300 and 2650° F. for a time sufficient to obtain the desired degree of sintering, porosity and shrinkage. A time period of at least 2 hours is usually required at these temperatures. The ternary calcium oxide base compositions of this invention provide core bodies of high strength even with a relatively mild sintering step. This property permits the formation of core bodies having relatively high porosity, that is up to 23% porosity, as well as a small amount of shrinkage which is of the order of 0 to 1%. The high porosity contributes to the relatively high solubility of the sintered core body in dilute acid. The low shrinkage enables core bodies to be formed with a tolerance of the order of 0.003 mil. The flexural strength of these sintered core bodies which have a 0 to 1% shrinkage and porosity of up to 23% is of the order of 4 to 6,000 p.s.i. The resultant sintered ternary calcium oxide base core body has high strength, high porosity, high solubility in leaching fluids, and low shrinkage, all desirable core body properties.

The following examples are given to illustrate the invention.

EXAMPLE NO. 1

The preferred ternary calcium oxide base composition is $2CaO \cdot Al_2O_3 \cdot SiO_2$. This compound was prepared by weighing two moles of reagent grade calcium carbonate, 1 mole of fused silica and 1 mole of alumina powder and placing them in a ball mill where they were ground for 8 hours. The resultant powder mixture was pressed into pellets under a pressure of 3,000 p.s.i. The pellets were air fired at 2500° F. for 16 hours to form the $$2CaO \cdot Al_2O_3 \cdot SiO_2$$

composition. It had been determined that a 2 hour firing period was sufficient for completion of the solid state fusion reaction in pellet form to form the ternary composition. The pellets were placed in an argon filled dry box and crushed and ground to pass through a −100 mesh U.S. Standard size screen. A lubricant and binder in the form of a 20 weight percent stearic acid in toluene solution was added to and mixed with the $$2CaO \cdot Al_2O_3 \cdot SiO_2$$

powder at a concentration of 1 weight percent solution and placed in a steel die which had the desired core shape. A pressure of 5,000 p.s.i. was applied to the steel die to form the green core. The green core was removed from the die and placed in a furnace and fired at a temperature of 2425±25° F. for a period of 2 hours.

The resultant sintered $2CaO \cdot Al_2O_3 \cdot SiO_2$ core had a flexural strength of 5,000 p.s.i. minimum. The shrinkage was 0.0% and the density was 2.13±0.03 gm./cc. The coefficient of thermal expansion of this core was determined to be $4.0 \times 10^{-6}$ in./in./° F.

The solubility of this core was determined to be 70.0±5.0 weight percent in 6 normal HCl at 180° F. The solubility was determined as follows: Weighed core specimens were leached with 6 normal HCl at 180° F., rinsed with diionized water, dried for 2 hours at 250° and reweighed. The samples were then fired to 1200° F. for 2 hours to expel chemically combined water of hydration and weighed for a third time. The total weight loss reflected the true solubility which is expressed in percent based upon the original weight of the core.

EXAMPLE NO. 2

The ternary calcium oxide base composition $$CaO \cdot Al_2O_3 \cdot SiO_2$$

is prepared by weighing 1 mole of reagent grade calcium carbonate, 1 mole fused silica and 1 mole of alumina and placing them in a ball mill where they were ground for 8 hours. The resultant mixture is treated as outlined in Example No. 1 to obtain a green core of the desired shape. The green core was placed in a furnace and fired at a temperature of 2350±25° F. for a period of 2 hours.

The resultant $CaO \cdot Al_2O_3 \cdot SiO_2$ core had a flexural strength of 4,000 p.s.i. minimum. The shrinkage was 1.0% and the density was 2.08±0.3 gm./cc. The coefficient of thermal expansion of this core was determined to be $3.5 \times 10^{-6}$ in./in./° F. The solubility of this core was determined to be 60.0±5.0% in 6 normal HCl at 180° F.

The core bodies described above in Examples 1 and 2 were optimized with respect to low shrinkage in order to minimize breakage or rejection of the core body due to distortion beyond specified tolerances. Even though the cores had low shrinkage, the flexural strength of the cores were higher than the 1200 to 3300 p.s.i. flexural strength of most commercial core bodies. The high solubility of these cores in hot dilute hydrochloric acid enables these core bodies to be readily leached by conventional leaching techniques.

While the invention has been described in terms of specific examples, it is to be understood that it is not limited thereby except as defined in the following claims.

What is claimed is:

1. A ceramic molding core body leachable in water or dilute hydrochloric acid consisting essentially of a sintered material selected from the group of ternary calcium oxide base compositions consisting of $$2CaO \cdot Al_2O_3 \cdot SiO_2$$

and $CaO \cdot Al_2O_3 \cdot SiO_2$, said sintered material being formed from the ternary calcium oxide base composition resulting from heating molar amounts of calcium carbonate, fused silica and alumina powder at a temperature of about 2500–2650° F. for about 2 hours.

2. A core body as described in claim 1 wherein said material is $2CaO \cdot Al_2O_3 \cdot SiO_2$.

3. A method of making a water or dilute hydrochloric acid leachable ceramic core of high strength comprising the steps of forming a ceramic core mixture containing molar amounts of calcium carbonate, fused silica and alumina powder which react at an elevated temperature of from about 2500 to 2650° F. to form a ternary calcium oxide base composition taken from the group consisting of $CaO \cdot Al_2O_3 \cdot SiO_2$ and $2CaO \cdot Al_2O_3 \cdot SiO_2$, firing said mixture at said temperature to yield said ternary calcium oxide base composition, grinding said ternary composition, forming a green core body with said ground ternary composition and firing said green core body at a temperature of from 2300 to 2650° F. to produce a porous, sintered core body.

4. A method as described in claim 3 wherein said green body is fired at a temperature of 2300 to 2650° F. for at least 2 hours.

5. A method as described in claim 3 wherein said green core body consisting essentially of $2CaO \cdot Al_2O_3 \cdot SiO_2$ is fired at a temperature between 2400 to 2550° F. for a time period of at least 2 hours.

6. A method as described in claim 3 wherein said green core body consisting essentially of $$CaO \cdot Al_2O_3 \cdot SiO_2$$

is fired at a temperature of about 2300 to 2400° F. for at least 2 hours.

References Cited

UNITED STATES PATENTS

| | | | |
|---|---|---|---|
| 2,948,631 | 8/1960 | McAllister | 106—63X |
| 3,423,216 | 1/1969 | Somers | 106—38.35 |
| 3,423,217 | 1/1969 | Blaha | 106—63X |

JULIUS FROME, Primary Examiner

L. B. HAYES, Assistant Examiner

U.S. Cl. X.R.

106—38.7, 63, 65, 69